US012730389B2

(12) United States Patent
Abe et al.

(10) Patent No.: US 12,730,389 B2
(45) Date of Patent: Sep. 8, 2026

(54) EXTERNAL ADDITIVE FOR TONER AND TONER

(71) Applicant: CANON KABUSHIKI KAISHA, Tokyo (JP)

(72) Inventors: Yukihiro Abe, Chiba (JP); Ichiro Kanno, Chiba (JP); Junichi Tamura, Ibaraki (JP); Mari Kaburagi, Chiba (JP); Hayato Ida, Ibaraki (JP); Masao Suzuki, Kanagawa (JP); Kei Inoue, Kanagawa (JP); Waka Hasegawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 389 days.

(21) Appl. No.: 18/510,943

(22) Filed: Nov. 16, 2023

(65) Prior Publication Data

US 2024/0184224 A1 Jun. 6, 2024

(30) Foreign Application Priority Data

Nov. 17, 2022 (JP) ................................ 2022-183911
Oct. 12, 2023 (JP) ................................ 2023-176392

(51) Int. Cl.
*G03G 9/08* (2006.01)
*G03G 9/097* (2006.01)

(52) U.S. Cl.
CPC ......... *G03G 9/0825* (2013.01); *G03G 9/0819* (2013.01); *G03G 9/0827* (2013.01); *G03G 9/09708* (2013.01); *G03G 9/09725* (2013.01); *G03G 9/09775* (2013.01)

(58) Field of Classification Search
CPC .. G03G 9/0825; G03G 9/0819; G03G 9/0827; G03G 9/09708; G03G 9/09725; G03G 9/09775
See application file for complete search history.

(56) References Cited

U.S. PATENT DOCUMENTS

| | | | |
|---|---|---|---|
| 2014/0295341 | A1 | 10/2014 | Fomitchev |
| 2021/0286281 | A1 | 9/2021 | Nishikawa |
| 2022/0187728 | A1 | 6/2022 | Miura |
| 2022/0236656 | A1 | 7/2022 | Kanno |

FOREIGN PATENT DOCUMENTS

| | | | |
|---|---|---|---|
| EP | 3674800 | A1 | 7/2020 |
| EP | 3929659 | A1 | 12/2021 |
| EP | 3674804 | B1 | 6/2022 |
| JP | 5522859 | B2 | 6/2014 |
| JP | 5982003 | B2 | 8/2016 |
| JP | 2016163866 | A | 9/2016 |
| JP | 6116711 | B2 | 4/2017 |
| JP | 2020012943 | A | 1/2020 |
| JP | 2021533239 | A | 12/2021 |
| WO | 2020/033357 | A1 | 2/2020 |

*Primary Examiner* — Mark F. Huff
*Assistant Examiner* — Charles Collins Sullivan, IV
(74) *Attorney, Agent, or Firm* — Canon U.S.A., Inc. IP Division

(57) ABSTRACT

The external additive for toner includes an external additive particle containing: a fine particle A; and a plurality of fine particles B that are each present so as to partially protrude from a surface of the fine particle A, wherein the fine particle A (i) is a particle of an organosilicon compound having a siloxane bond, (ii) has a number-average particle diameter of 0.03 μm or more and 0.30 μm or less, and (iii) has an average circularity of 0.90 or more, wherein, when the number-average particle diameter of the fine particle A is represented by $D_A$, and a number-average particle diameter of the plurality of fine particles B is represented by $D_B$, $D_B/D_A$ is 0.10 or more and 0.63 or less.

9 Claims, No Drawings

EXTERNAL ADDITIVE FOR TONER AND TONER

BACKGROUND

Field of the Disclosure

The present disclosure relates to an external additive for toner and a toner.

Description of the Related Art

In recent years, a full-color copying machine of an electrophotographic system has become widespread, and a toner used for electrophotography has been increasingly required to respond to an increase in printing speed and to have a longer life.

In general, spherical silica has hitherto been widely known as an external additive used in a toner. The addition of an external additive improves the flowability of a toner. However, it may be difficult to maintain the performance for a long period of time. For example, silica particles are harder than toner particles, and hence the silica particles may be embedded in the toner particles after a long-term use. When large-diameter silica particles are used, the stress is alleviated, and hence the embedding of the silica particles into the toner can be reduced. However, in the case of the large-diameter silica particles, the falling of the silica particles from the toner may become a problem.

In Japanese Patent No. 5982003 and Japanese Patent Application Laid-Open No. 2021-533239, there is a disclosure of a toner composition containing toner particles mixed with powder containing metal oxide-polymer composite material particles each of which contains a polymer matrix and a plurality of metal oxide particles that are partially embedded in the polymer matrix and protrude outside therefrom. There is an example in which the embedding into the toner and the falling from the toner are relieved through use of the above-mentioned composite fine particles.

It has been found that, even when the composite fine particles disclosed in Japanese Patent No. 5982003 and Japanese Patent Application Laid-Open No. 2021-533239 are used as an external additive, the external additive is transferred from the toner particles to other members to contaminate the surface of a photosensitive member and a charging roller, to thereby cause an image defect.

SUMMARY OF THE DISCLOSURE

An object of the present disclosure is to provide an external additive for toner and a toner that solve the above-mentioned problems. Specifically, an object of the present disclosure is to provide an external additive for toner and a toner that are excellent in durable stability and enable a high-quality image to be obtained for a long period of time.

The present disclosure provides an external additive for toner comprising an external additive particle containing: a fine particle A; and a plurality of fine particles B that are each present so as to partially protrude from a surface of the fine particle A, wherein the fine particle A (i) is a particle of an organosilicon compound having a siloxane bond, (ii) has a number-average particle diameter of 0.03 μm or more and 0.30 μm or less, and (iii) has an average circularity of 0.90 or more, wherein, when the number-average particle diameter of the fine particle A is represented by $D_A$, and a number-average particle diameter of the plurality of fine particles B is represented by $D_B$, $D_B/D_A$ is 0.10 or more and 0.63 or less, wherein the plurality of fine particles B have an average value of embedding ratios, each of which is defined by the following expression (1), of 30% or more and 80% or less, and wherein, when a projection image of the external additive particle is obtained, and a line that convexly closes the projection image is drawn, the line that convexly closes the projection image has a portion that overlaps a contour of the fine particle A.

$$\text{Embedding ratio (\%) of fine particle } B = (\text{depth of fine particle } B \text{ embedded in fine particle } A/\text{diameter of fine particle } B)\times 100 \quad (1)$$

In addition, the present disclosure provides a toner comprising: a toner particle; and the external additive for toner having the above structure.

Further features of the present disclosure will become apparent from the following description of exemplary embodiments.

DESCRIPTION OF THE EMBODIMENTS

In the present disclosure, the description "○○ or more and xx or less" or "from ○○ to xx" representing a numerical range means a numerical range including a lower limit and an upper limit that are end points unless otherwise stated. Further, as used herein, "(a)" may refer to the content ratio on a number basis of the unit (a) in the fine particle A with respect to all silicon atoms present in the fine particle A, "(b)" may refer to the content ratio on a number basis of the unit (b) in the fine particle A with respect to all silicon atoms present in the fine particle A, and "(c)" may refer to the content ratio on a number basis of the unit (c) in the fine particle A with respect to all silicon atoms present in the fine particle A.

The inventors of the present disclosure conceive that the mechanism via which the effect of the present disclosure is expressed is as described below.

For example, the composite particles disclosed in the above-mentioned literatures can suppress the falling from the toner particles. However, when the external additive particles externally added to the toner are brought into contact with members, such as a magnetic carrier, a photosensitive member, and an intermediate transfer belt, the adhesive force with respect to the above-mentioned members may also be increased. When the adhesive force with respect to the members other than the toner particles is increased, the external additive may be transferred from the toner particles to those members, and the external additive that has been excessively transferred may contaminate a photosensitive member and a charging roller, to thereby influence an output image.

The inventors have made extensive investigations, and as a result, have found that, when the shape of each of the external additive particles is optimized, the adhesive force of the external additive particles with respect to the magnetic carrier, the photosensitive member, the intermediate transfer belt, and the like can be suppressed while the adhesive force of the external additive particles with respect to the toner particles is improved. Thus, the present disclosure has been completed.

In powder particles, the adhesion to the members and the aggregation between the particles occur. There are three forces that are fundamental when considering the phenomenon of adhesion and aggregation of particles. The forces are a van der Waals force, an electrostatic force, and a liquid bridge force. Of those, the van der Waals force is conceived to be important when the adhesion and aggregation of the external additive for toner are considered. The van der Waals force is a force that occurs between atoms and molecules. When objects are brought into contact with each other, the force proportional to the contact area between the objects acts.

For example, the van der Waals force (Fv) that acts when a sphere having a diameter D1 and a sphere having a diameter D2 are brought into contact with each other is represented by the following expression. The minus sign indicates an attractive force.

$$Fv=-A/(12\times z^2)d$$

$$(d=D1\times D2/(D1+D2))$$

where A represents a Hamaker constant, and "z" represents a separation distance between two particles. In the case of adhesion in a gas phase, "z" is set to about 0.4 nm based on the balance with Born repulsion.

In general, the diameter of each of the external additive particles used as spacer particles that impart flowability to the toner is about 0.03 μm or more and about 0.30 μm or less, and the diameter of each of the toner particles is about 4 μm or more and about 8 μm or less. Thus, in the case where the van der Waals force between the external additive particles and the toner particles is taken into consideration, when the diameter of each of the external additive particles is represented by D1 and the diameter of each of the toner particles is represented by D2, D1<<D2 is established. Thus, the toner particle surface can be considered by being approximated as a plane. In other words, the van der Waals force (Fv) acting between the external additive having the diameter D1 and the toner particles can be represented by the following expression.

$$Fv=-A/(12\times z^2)\times D1$$

In the above-mentioned expression, A represents a Hamaker constant, and "z" represents a separation distance between the particles and the plane. In the case of adhesion in a gas phase, "z" is set to about 0.4 nm based on the balance with Born repulsion.

The other members with which the external additive particles are brought into contact are each larger than the toner particles, and hence the van der Waals forces acting between the external additive particles and the toner particles and between the external additive and the other members are proportional to the diameter of a contact portion of the external additive particles with which the toner or the other members are brought into contact.

One of the important roles of the external additive is to suppress the aggregation of the toner and to reduce the adhesive force between the toner and the members. In order to allow the above-mentioned roles to function stably, it is required that the external additive particles adhere to the toner particles, to which the external additive particles are externally added, with a high adhesive force, and that the adhesive force between the external additive carried on the toner particles and the other members be reduced. In the case of spherical particles, when the spherical particles are simultaneously brought into contact with two planes, and the Hamaker coefficients are equal, there is a 50-50 probability that the spherical particles may adhere to any one of the planes. As described above, the van der Waals force between the external additive particles and the toner particles or the other members is a force proportional to the diameter of the external additive in a contact portion. Thus, in order to satisfy the above-mentioned requirements, it is effective for the external additive to have an increased contact area with the toner to which the external additive is externally added, and to have a decreased contact area with the other members.

[External Additive for Toner]

The external additive for toner of the present disclosure is an external additive for toner comprising an external additive particle containing: a fine particle A; and a plurality of fine particles B that are each present so as to partially protrude from a surface of the fine particle A, wherein the fine particle A (i) is a particle of an organosilicon compound having a siloxane bond, (ii) has a number-average particle diameter of 0.03 μm or more and 0.30 μm or less, and (iii) has an average circularity of 0.90 or more, wherein, when the number-average particle diameter of the fine particle A is represented by $D_A$, and a number-average particle diameter of the plurality of fine particles B is represented by $D_B$, $D_A/D_A$ is 0.10 or more and 0.63 or less, wherein the plurality of fine particles B have an average value of embedding ratios, each of which is defined by the following expression (1), of 30% or more and 80% or less, and wherein, when a projection image of the external additive particle is obtained, and a line that convexly closes the projection image is drawn, the line that convexly closes the projection image has a portion that overlaps a contour of the fine particle A.

Embedding ratio (%) of fine particle *B*=(depth of fine particle *B* embedded in fine particle *A*/diameter of fine particle *B*)×100 (1)

The external additive particles of the present disclosure each have a shape in which fine particles B are present so as to partially protrude from the surface of each of fine particles A having an average circularity of 0.90 or more. In other words, the external additive particles of the present disclosure each have a shape in which convex portions formed of the fine particles B are formed on the surface of a base particle defined by each of the fine particles A.

When the requirements prescribed in the present disclosure described in detail later are satisfied in addition to the above-mentioned shape, the external additive particle of the present disclosure can "be brought into contact with the toner particle at three points including the base particle and the two convex portions with respect to the plane." It is conceived that, in an external addition step, the external additive particle is externally added to the toner particle so as to achieve a higher adhesive force. That is, it is conceived that the external additive particle converges to a state of being brought into contact with the toner particle at three points including the base particle and the two convex portions as described above. Meanwhile, the convex portions of the external additive particle can be easily present on the outer side of the toner particle. Thus, it is conceived that, when the external additive carried on the toner is brought into contact with the other members, the probability of contact with the convex portions of the external additive particle is increased.

When the shape of the external additive for toner of the present disclosure is optimized, the external additive for toner can achieve a high adhesive force with respect to the toner particles and a low adhesive force with respect to the other members. The van der Waals forces (Fv) of an ideal adhesive force with respect to the toner particles and an ideal adhesive force with respect to the other members can be respectively represented as described below.

$$Fv=-A/(12\times z^2)\times D1-2\times A/(12\times z^2)\times D2$$ Adhesive force with respect to the toner particles $$Fv=-A/(12\times z^2)\times D2$$ Adhesive force with respect to the other members Specifically, the adhesive force with respect to the toner particles can be set to be larger than the adhesive force with respect to the other members by $-A/(12\times z^2)\times D\mathbf{1}-A/(12\times z^2)\times D\mathbf{2}$.

(Description of Fine Particles A)

In the external additive for toner of the present disclosure, the fine particles A are particles of an organosilicon compound having a siloxane bond. A method of producing the external additive for toner of the present disclosure is not particularly limited, but it is preferred that the particles be formed through the hydrolysis and polycondensation reaction of a silicon compound (silane monomer) by a sol-gel method. Specifically, a mixture of a bifunctional silane having two siloxane bonds and a tetrafunctional silane having four siloxane bonds is subjected to hydrolysis and polycondensation, and colloidal silica (in the case where the fine particles B described later are silica fine particles) and the like are allowed to react with the resultant to form composite particles, thereby being capable of producing the external additive of the present disclosure.

In the external additive for toner of the present disclosure, the fine particles A have a number-average particle diameter $D_A$ of 0.03 μm or more and 0.30 μm or less. When the $D_A$ falls within the above-mentioned range, the external additive fine particles function as spacer particles, and the toner particles can be uniformly coated with the external additive fine particles. In the case where the fine particles A have a number-average particle diameter of less than 0.03 μm, when images each having a low print density are output in a large number for a long period of time, the stress on the toner is increased, and hence there is a risk in that the external additive particles are liable to be embedded into the surface of the toner. In addition, when the fine particles A have a number-average particle diameter of more than 0.30 μm, there is a risk in that the external additive particles are liable to be separated from the surface of the toner.

The number-average particle diameter $D_A$ of the fine particles A can be increased by lowering the reaction temperature, shortening the reaction time, or increasing the amount of a catalyst in the hydrolysis and polycondensation steps. In addition, the number-average particle diameter of the fine particles A can be decreased by increasing the reaction temperature, lengthening the reaction time, or decreasing the amount of a catalyst in the hydrolysis and polycondensation steps.

The number-average particle diameter $D_A$ of the fine particles A is more preferably 0.07 μm or more and 0.20 μm or less, still more preferably 0.08 μm or more and 0.15 μm or less from the above-mentioned viewpoints.

As described above, high circularity is obtained by forming particles of the fine particles A through the hydrolysis and polycondensation reaction of a silicon compound (silane monomer) by a sol-gel method.

When the ratio $D_B/D_A$ of the number-average particle diameter $D_A$ of the fine particles A and the number-average particle diameter $D_B$ of the fine particles B, the embedding ratio of the fine particle B, and the relationship between a line that convexly closes a projection image of the external additive particle and a contour of the fine particle A when the projection image is obtained and the line that convexly closes the projection image is drawn are set within the above-mentioned ranges, a high adhesive force is obtained between the external additive particles and the toner, and the adhesive force between the other members and the external additive particles can be suppressed.

First, when the number-average particle diameter of the fine particles A of the external additive particles forming the external additive for toner of the present disclosure is represented by $D_A$, and the number-average particle diameter of the fine particles B thereof is represented by $D_B$, $D_B/D_A$ is 0.10 or more and 0.63 or less. In the case where the $D_B/D_A$ is less than 0.10, when the external additive particles forming the external additive of the present disclosure are brought into contact with the toner, the van der Waals force obtained at the time of contact between the portions of the fine particles B and the toner is less than 10% of the van der Waals force obtained at the time of contact between the portions of the fine particles A and the toner, and hence a high adhesive force with respect to the toner is not obtained. Meanwhile, when the $D_B/D_A$ is more than 0.63, it becomes difficult to carry a sufficient number of the fine particles B on the surface of each of the fine particles A. Thus, when the external additive particles externally added to the toner are brought into contact with the other members, the probability of contact with the members in the portions of the fine particles A is increased. As a result, the adhesive force between the toner and the members cannot be sufficiently reduced. The preferred range of the $D_B/D_A$ is 0.30 or more and 0.55 or less.

In the $D_B/D_A$, the $D_A$ may be controlled by the formation conditions of the fine particles A as described above. Alternatively, when the fine particles B are, for example, silica particles, the number-average particle diameter DM of the fine particles B may be controlled by selecting the primary particle diameter of colloidal silica employed in the production. That is, through control of the $D_A$ and/or $D_A$, the $D_A/D_A$ can be set to a predetermined range.

(Description of Embedding Ratio of Fine Particle B)

Next, an average value of embedding ratios of the fine particles B of the external additive particles forming the external additive for toner of the present disclosure defined by the following expression (1) is 30% or more and 80% or less.

$$\text{Embedding ratio (\%) of fine particle } B=(\text{depth of fine particle } B \text{ embedded in fine particle } A/\text{diameter of fine particle } B)\times 100 \quad (1)$$

When the average value of the embedding ratios of the fine particles B is less than 30%, the fine particles B may be separated from the fine particles A, and the effect of the present disclosure is not obtained. In addition, when the average value of the embedding ratios of the fine particles B is more than 80%, the fine particles B are not easily brought into contact with the toner when the external additive and the toner are brought into contact with each other, and hence the effect of the present disclosure is not obtained. The more preferred range of the average value of the embedding ratios of the fine particles B is 50% or more and 80% or less.

The embedding ratio of the fine particle B can be controlled by the reaction time and reaction temperature with the above-mentioned monomer related to the fine particle A. When the embedding ratio needs to be decreased, there is given a method involving shortening the reaction time between the above-mentioned monomer and the fine particle B or lowering the reaction temperature therebetween. When the embedding ratio needs to be increased, there is given a method involving lengthening the reaction time between the above-mentioned monomer and the fine particle B or increasing the reaction temperature therebetween.

(Description of Contact Point between Convex Closure and Contour of Fine Particle A)

Further, when a projection image of the external additive particle forming the external additive of the present disclosure is obtained, and a line that convexly closes the projection image is drawn, the line that convexly closes the projection image is set to a shape having a portion that overlaps a contour of the fine particle A. With this shape, when the external additive particle forming the external additive of the present disclosure is brought into contact with the toner, a portion of the fine particle A and portions of the two fine particles B can be brought into contact with the toner. As a result, a high adhesive force with respect to the toner particle is obtained. In addition, when the external additive particle is brought into contact with the toner particle at three points, the external additive particle becomes less liable to roll over the surface of the toner particle, and hence the external addition state becomes stable.

In order for the line that convexly closes the projection image to have a shape having a portion that overlaps the contour of the fine particle A, the shape can be controlled by the $D_A/D_B$, the embedding ratio of the fine particle B, and the number of the fine particles B present on the surface of each of the fine particles A. For the control of the $D_A/D_B$ and the embedding ratio of the fine particle B, there are given the above-mentioned methods. The number of the fine particles B present on the surface of each of the fine particles A can be controlled by the raw material ratio in consideration of the specific gravities of raw materials for the fine particles A and the fine particles B when the external additive particles are produced. The number of the fine particles B present on the surface of each of the fine particles A can be reduced by decreasing the raw material ratio of the fine particles B. In addition, the number of the fine particles B present on the surface of each of the fine particles A can be increased by increasing the raw material ratio of the fine particles B. When each of the above described values falls within an appropriate range, the line that convexly closes the projection image can have a shape having a portion that overlaps the contour of the fine particle A.

(Description of Average Number $N_B$ of Fine Particles B)

In order to stably obtain the effect of the present disclosure, the average number Na of the fine particles B to be carried on the surface of each of the fine particle A is preferably in a range of the following expression (2).

$$1.2\times D_A/D_B \le N_B \le 3.0\times D_A/D_B \quad (2)$$

When the average number $N_B$ falls within the above-mentioned range, the probability that the external additive particle can be brought into contact with the toner particle at three points including the base particle and the two convex portions is increased, and the probability that the external additive particle is brought into contact with each of the other members at one point of the convex portion is increased. In the above-mentioned expression, the optimum range of the Na depends on the $D_A/D_B$ because, as the $D_B$ becomes smaller with respect to the $D_A$, it becomes more difficult for the two convex portions to be simultaneously brought into contact with the toner particle, and hence it is required to increase the number of the fine particles B to be carried on the surface of each of the fine particles A.

(Description of Composition of Fine Particle A)

It is preferred that content ratios (on a number basis) of the following unit (a), unit (b), and unit (c) in the fine particle A of the external additive for toner of the present disclosure with respect to all silicon atoms present in the fine particle A satisfy the following expressions (3-1) and (3-2):

$$(a)+(b)+(c)\ge 0.80 \quad (3\text{-}1)$$

$$(b)+(c)\ge 0.30 \quad (3\text{-}2)$$

(a)

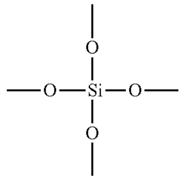

(b)

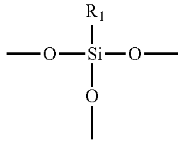

(c)

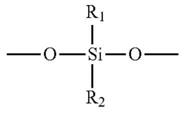

where $R_1$ and $R_2$ each represent an alkyl group having 1 or more and 6 or less carbon atoms.

In the case where the content ratios fall within the above-mentioned ranges, when the toner receives a stress from a member such as a carrier, the external additive itself is less liable to be fractured. Further, due to the appropriate flexibility, the embedding of the external additive into the surface of the toner particle can be suppressed. Thus, the toner surface state is less liable to be changed, and change in the chargeability of the toner and change in the adhesive force can be further suppressed. The content ratios of the above-mentioned unit (a), unit (b), and unit (c) in the external additive can be controlled by the addition amount of the above-mentioned monomer.

Further, it is preferred that the content ratios of the unit (a), the unit (b), and the unit (c) in the fine particle A of the external additive for toner of the present disclosure satisfy the following expressions (4-1), (4-2), and (4-3).

$$0.30\le (a)/((a)+(b)+(c))\le 0.80 \quad (4\text{-}1)$$

$$0\le (b)/((a)+(b)+(c))\le 0.50 \quad (4\text{-}2)$$

$$0.20\le (c)/((a)+(b)+(c))\le 0.70 \quad (4\text{-}3)$$

It is more preferred that the content ratios fall within the above-mentioned ranges from the viewpoint of durable stability of the toner because the amount of Si—R present in the external additive becomes optimum.

(Description of Fine Particles B)

The fine particles B of the external additive for toner of the present disclosure are preferably silica fine particles or alumina fine particles. When the fine particles B are the above-mentioned fine particles, those fine particles have appropriate hardness, and hence the sticking property with respect to the toner particles is enhanced. The foregoing is preferred also from the viewpoint of durable stability. In addition, silica fine particles are more preferred from the viewpoint of reactivity with the above-mentioned monomer component related to the fine particles A. The silica fine particles used in the present disclosure are particles containing silica (that is, $SiO_2$) as a main component, and may be particles produced through use of water glass or a silicon compound such as alkoxysilane as a raw material, or particles obtained by pulverizing quartz.

Specifically, there are given silica particles produced by a sol-gel method, precipitated silica particles produced by a precipitation method, aqueous colloidal silica particles, fumed silica particles obtained by a gas phase process, fused silica particles, and the like. Of those, the aqueous colloidal silica particles are preferred from the viewpoints of reactivity with the above-mentioned monomer component and dispersion stability. The aqueous colloidal silica particles are commercially available or can be prepared from various starting materials by a known method. The aqueous colloidal silica particles can be prepared from silicic acid derived from an alkali silicate solution having a pH of from about 9 to about 11, and silicate anions undergo polymerization to generate silica particles having a desired average particle diameter in the form of an aqueous dispersion liquid.

(Description of Addition Amount of External Additive)

The content of the external additive for toner of the present disclosure is preferably 0.1 part by mass or more and 20.0 parts by mass or less with respect to 100 parts by mass of the toner particles from the viewpoint of charging stability. The content is more preferably 0.5 part by mass or more and 15.0 parts by mass or less, still more preferably 1.0 part by mass or more and 10.0 parts by mass of less.

In the case where the content of the external additive is less than 0.1 part by mass, when images each having a low print density are output in a large number for a long period of time under a severe environment such as a high-temperature and high-humidity environment, the stress applied to the toner cannot be suppressed, and the effect of durable stability is not easily obtained. In addition, in the case where the content of the external additive is more than 20.0 parts by mass, when images are output for a long period of time, there is a risk in that filming of external additive particles onto a carrier, a charging member, and a photosensitive member may occur.

(Method of producing External Additive of Present Disclosure)

A method of producing the external additive of the present disclosure is not particularly limited, but the production method using a sol-gel method is described as an example. It is preferred that the silicon compound be produced by the following method. Specifically, it is preferred that the method include: a first step of obtaining a hydrolysate of a silicon compound; a second step of mixing the hydrolysate with an alkaline aqueous medium and colloidal silica when the fine particles B are silica fine particles to subject the hydrolysate to a polycondensation reaction and a reaction with the colloidal silica; and a third step of mixing the polycondensation reaction product with an aqueous solution, followed by particle formation. In some cases, a hydrophobizing agent may be further blended therein.

In the first step, the silicon compound and the catalyst are brought into contact with each other by a method, such as stirring or mixing, in an aqueous solution in which an acidic or alkaline substance serving as a catalyst is dissolved in water. A known catalyst may be suitably used as the catalyst. Specific examples of the catalyst include: acid catalysts, such as acetic acid, hydrochloric acid, hydrofluoric acid, sulfuric acid, and nitric acid; and basic catalysts, such as ammonia water, sodium hydroxide, and potassium hydroxide.

The usage amount of the catalyst may be appropriately adjusted in accordance with the kinds of the silicon compound and the catalyst. The usage amount is preferably selected in a range of $1\times10^{-3}$ part by mass or more and 1 part by mass or less with respect to 100 parts by mass of water used in the hydrolysis of the silicon compound.

When the usage amount of the catalyst is $1\times10^{-3}$ part by mass or more, the reaction sufficiently proceeds. Meanwhile, when the usage amount of the catalyst is 1 part by mass or less, the concentration of the catalyst remaining as an impurity in the fine particle becomes low, and the hydrolysis can be easily performed. The usage amount of the water is preferably 2 mol or more and 15 mol or less with respect to 1 mole of the silicon compound. When the amount of the water is 2 mol or more, the hydrolysis reaction sufficiently proceeds. When the amount of the water is 15 mol or less, the productivity is improved.

The reaction temperature is not particularly limited, and the reaction may be performed at normal temperature or in a heated state. However, it is preferred that the reaction be performed under a state in which the temperature is kept at from 10° C. to 60° C. because a hydrolysate is obtained in a short period of time, and the partial condensation reaction of the produced hydrolysate can be suppressed. The reaction time is not particularly limited and may be appropriately selected in consideration of the reactivity of the silicon compound to be used, the composition of a reaction liquid prepared by blending the silicon compound with an acid and water, and the productivity.

In the method of producing the silicon polymer particle, as the second step, the raw material solution obtained in the first step is mixed with an alkaline aqueous medium to subject a particle precursor to a polycondensation reaction. Thus, a polycondensation reaction liquid is obtained. Here, the alkaline aqueous medium is a liquid obtained by mixing an alkali component, water, and as required, an organic solvent and the like.

An alkali component used in the alkaline aqueous medium exhibits basicity in its aqueous solution, and acts as a neutralizer for the catalyst used in the first step and as a catalyst for the polycondensation reaction in the second step. Examples of such alkali component may include: alkali metal hydroxides, such as lithium hydroxide, sodium hydroxide, and potassium hydroxide; ammonia; and organic amines, such as monomethylamine and dimethylamine.

The usage amount of the alkali component is such an amount that the alkali component neutralizes an acid and effectively acts as a catalyst for the polycondensation reaction. For example, when ammonia is used as the alkali component, its usage amount is usually selected in a range of 0.01 part by mass or more and 12.5 parts by mass or less with respect to 100 parts by mass of a mixture of the water and the organic solvent.

In the second step, in order to prepare the alkaline aqueous medium, the organic solvent may be further used in addition to the alkali component and the water. The organic solvent is not particularly limited as long as the organic solvent has compatibility with the water, but an organic solvent that dissolves 10 g or more of the water per 100 g at normal temperature and normal pressure is suitable.

Specific examples thereof include: alcohols, such as methanol, ethanol, n-propanol, 2-propanol, and butanol; polyhydric alcohols, such as ethylene glycol, diethylene glycol, propylene glycol, glycerin, trimethylolpropane, and hexanetriol; ethers, such as ethylene glycol monoethyl ether, acetone, diethyl ether, tetrahydrofuran, and diacetone alcohol; and amide compounds, such as dimethylformamide, dimethylacetamide, and N-methylpyrrolidone.

Of the organic solvents listed above, alcohol-based solvents, such as methanol, ethanol, 2-propanol, and butanol, are preferred. Further, from the viewpoints of hydrolysis and a dehydration condensation reaction, it is more preferred to select, as the organic solvent, the same alcohol as an alcohol to be generated as an elimination product.

In the third step, the polycondensation reaction product obtained in the second step and an aqueous solution are mixed, followed by particle formation. Water (e.g., tap water or pure water) may be suitably used as the aqueous solution, but a component exhibiting compatibility with water, such as a salt, an acid, an alkali, an organic solvent, a surfactant, or a water-soluble polymer, may be further added to the water. The temperature of each of the polycondensation reaction liquid and the aqueous solution at the time of the mixing is not particularly restricted, and is preferably selected in a range of from 5° C. to 70° C. in consideration of the composition thereof, the productivity, and the like.

A known method may be used as a method of recovering the particle without any particular limitation. There are given, for example, a method involving scooping up floating powder and a filtration method. Of those, a filtration method is preferred because its operation is simple. The filtration method is not particularly limited, and any known device for vacuum filtration, centrifugal filtration, or pressure filtration, or the like may be selected. Filter paper, a filter, a filter cloth, and the like used in the filtration are not particularly limited as long as they are industrially available, and may be appropriately selected in accordance with a device to be used.

The monomer to be used may be appropriately selected depending on, for example, compatibility with the solvent and the catalyst, or hydrolyzability. Examples of a tetrafunctional silane monomer having the structure (a) include tetramethoxysilane, tetraethoxysilane, and tetraisocyanatosilane. Of those, tetraethoxysilane is preferred.

Examples of a trifunctional silane monomer having the structure (b) include methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane. Of those, methyltrimethoxysilane is preferred.

Examples of a bifunctional silane monomer having the structure (c) include di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethoxydimethylsilane, diethoxydimethylsilane, and diethyldimethoxysilane. Of those, dimethoxydimethylsilane is preferred.

It is preferred that the surface of the external additive for toner of the present disclosure be subjected to surface treatment with a hydrophobic treatment agent. The hydrophobic treatment agent is not particularly limited but is preferably an organosilicon compound.

Examples thereof may include: alkylsilazane compounds such as hexamethyldisilazane: alkylalkoxysilane compounds, such as diethyldiethoxysilane, trimethylmethoxysilane, methyltrimethoxysilane, and butyltrimethoxysilane; fluoroalkylsilane compounds such as trifluoropropyltrimethoxysilane: chlorosilane compounds, such as dimethyldichlorosilane and trimethylchlorosilane; siloxane compounds such as octamethylcyclotetrasiloxane: silicon oil; and silicon varnish.

Through the hydrophobic treatment of the surface of the external additive for toner, a change in adhesive force of the toner after endurance can be suppressed. In particular, the fine particle is preferably subjected to surface treatment with at least one compound selected from the group consisting of: an alkylsilazane compound; an alkylalkoxysilane compound; a chlorosilane compound; a siloxane compound; and silicone oil. Further, the external additive for toner is more preferably subjected to surface treatment with the alkylsilazane compound from the above-mentioned viewpoint.

[Toner Particle]

Next, the configuration of a toner particle to which the above-mentioned fine particle of the present disclosure is externally added is described in detail.

<Binder Resin>

A binder resin used in the toner of the present disclosure is not particularly limited, and the following polymers or resins may be used.

There are given, for example, homopolymers of styrene and substituted products thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-α-chloromethyl methacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; and polyvinyl chloride, a phenol resin, a natural resin-modified phenol resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, polyvinyl butyral, a terpene resin, a coumarone-indene resin, and a petroleum resin. Of those, polyester resin is preferable from the viewpoint of durable stability and charging stability.

In addition, the acid value of the polyester resin is preferably 0.5 mgKOH/g or more and 40 mgKOH/g or less from the viewpoints of the environmental stability and the charging stability. The acid value in the polyester resin and Si—R in the fine particle interact with each other. Thus, the durability and the chargeability of the toner under the high-temperature and high-humidity environment can be further improved. The acid value is more preferably 1 mgKOH/g or more and 20 mgKOH/g or less, still more preferably 1 mgKOH/g or more and 15 mgKOH/g or less.

<Colorant>

A colorant may be used as required in the toner of the present disclosure. Examples of the colorant include the following.

As a black colorant, there are given, for example: carbon black: and a colorant toned to a black color with a yellow colorant, a magenta colorant, and a cyan colorant. Although a pigment may be used alone as the colorant, a dye and the pigment are more preferably used in combination to improve the clarity of the colorant in terms of the quality of a full-color image.

As a pigment for magenta toner, there are given, for example: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a dye for a magenta toner, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40: and C.I. Basic Violet 1, 3, 7, 10, 14, 15, 21, 25, 26, 27, or 28.

As a pigment for a cyan toner, there are given, for example C.I. Pigment Blue 2, 3, 15:2, 15:3, 15:4, 16, or 17; C.I. Vat Blue 6: C.I. Acid Blue 45; and a copper phthalocyanine pigment in which a phthalocyanine skeleton is substituted by 1 to 5 phthalimidomethyl groups.

As a dye for a cyan toner, for example, C.I. Solvent Blue 70 is given.

As a pigment for a yellow toner, there are given, for example: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

As a dye for a yellow toner, for example, C.I. Solvent Yellow 162 is given.

The content of the colorant is preferably 0.1 part by mass or more and 30.0 parts by mass or less with respect to 100 parts by mass of the binder resin.

<Wax>

A wax may be used as required in the toner of the present disclosure. Examples of the wax include the following.

Hydrocarbon-based waxes, such as microcrystalline wax, paraffin wax, and Fischer-Tropsch wax, oxidized products of hydrocarbon-based waxes such as oxidized polyethylene wax, or block copolymers thereof; waxes each containing a fatty acid ester as a main component, such as carnauba wax; and waxes obtained by partially or wholly deacidifying fatty acid esters, such as deacidified carnauba wax.

Further, the examples include the following: saturated linear fatty acids, such as palmitic acid, stearic acid, and montanic acid; unsaturated fatty acids, such as brassidic acid, eleostearic acid, and parinaric acid, saturated alcohols, such as stearyl alcohol, aralkyl alcohol, behenyl alcohol, carnaubyl alcohol, ceryl alcohol, and melissyl alcohol; polyhydric alcohols such as sorbitol; esters of fatty acids, such as palmitic acid, stearic acid, behenic acid, and montanic acid, and alcohols, such as stearyl alcohol, aralkyl alcohol, behenyl alcohol, carnaubyl alcohol, ceryl alcohol, and melissyl alcohol: fatty acid amides, such as linoleamide, oleamide, and lauramide; saturated fatty acid bisamides, such as methylene bis stearamide, ethylene bis capramide, ethylene bis lauramide, and hexamethylene bis stearamide; unsaturated fatty acid amides, such as ethylene bis oleamide, hexamethylene bis oleamide, N,N'-dioleyladipamide, and N,N'-dioleylsebacamide; aromatic bisamides, such as m-xylenebisstearamide and N,N'-distearylisophthalamide: fatty acid metal salts (generally called metal soaps), such as calcium stearate, calcium laurate, zinc stearate, and magnesium stearate; waxes each obtained by grafting a vinyl-based monomer, such as styrene or acrylic acid, to an aliphatic hydrocarbon-based wax: partially esterified products of fatty acids and polyhydric alcohols, such as behenic acid monoglyceride; and methyl ester compounds each having a hydroxy group obtained by hydrogenation of a plant oil and fat.

The content of the wax is preferably 2.0 parts by mass or more and 30.0 parts by mass or less with respect to 100 parts by mass of the binder resin.

<Charge Control Agent>

A charge control agent may be incorporated into the toner of the present disclosure as required. Although a known charge control agent may be utilized as the charge control agent to be incorporated into the toner, a metal compound of an aromatic carboxylic acid is particularly preferred because the compound is colorless, increases the charging speed of the toner, and can stably hold a constant charge quantity.

As a negative charge control agent, there are given, for example: a salicylic acid metal compound; a naphthoic acid metal compound; a dicarboxylic acid metal compound, a polymer-type compound having a sulfonic acid or a carboxylic acid in a side chain thereof; a polymer-type compound having a sulfonate or a sulfonic acid esterified product in a side chain thereof; a polymer-type compound having a carboxylate or a carboxylic acid esterified product in a side chain thereof; a boron compound; a urea compound, a silicon compound; and a calixarene. The negative charge control agent may be internally or externally added to the toner particles.

The addition amount of the charge control agent is preferably 0.2 part by mass or more and 10.0 parts by mass or less with respect to 100 parts by mass of the binder resin.

<Inorganic Fine Powder>

In the toner of the present disclosure, in addition to the above-mentioned external additive for toner, another inorganic fine powder may be used in combination as required. The inorganic fine powder may be internally added to the toner particle or may be mixed with the toner base particle as an external additive. The external additive is preferably inorganic fine powder such as silica. The inorganic fine powder is preferably hydrophobized with a hydrophobizing agent such as a silane compound, silicone oil, or a mixture thereof.

As an external additive for improving the flowability, inorganic fine powder having a specific surface area of 50 $m^2/g$ or more and 400 $m^2/g$ or less is preferred. An inorganic fine particle having a specific surface area in the above-mentioned range may be used in combination in order to achieve both the improvement of the flowability and the stabilization of the durability.

The inorganic fine powder is preferably used in an amount of 0.1 part by mass or more and 10.0 parts by mass or less with respect to 100 parts by mass of the toner particle. When the above-mentioned range is satisfied, the effect of the durable stability is easily obtained.

<Developer>

The toner of the present disclosure, which may be used as a one-component developer, is preferably used as a two-component developer by being mixed with a magnetic carrier for further improving its dot reproducibility because a stable image can be obtained for a long period of time.

Generally known carriers may be used as the magnetic carrier, and examples of the magnetic carrier include: surface-oxidized iron powder or unoxidized iron powder; particles of metals, such as iron, lithium, calcium, magnesium, nickel, copper, zinc, cobalt, manganese, chromium and rare earths, and particles made of alloys thereof or particles made of oxides thereof; a magnetic material such as ferrite; and a magnetic material-dispersed resin carrier (so-called resin carrier) containing a magnetic material and a binder resin holding the magnetic material under a state in which the magnetic material is dispersed therein.

The contact frequency between the toner and the magnetic carrier is significantly higher than the contact frequency between the toner and each of the other members. Thus, the frequency of contact with the magnetic carrier of the external additive for toner externally added to the toner is increased. In order to prevent the external additive for toner of the present disclosure from being transferred from the toner to the magnetic carrier, it is desired that the adhesive force with respect to the magnetic carrier be suppressed. That is, it is appropriate that the contact area between the external additive for toner and the carrier be set to be small. For this purpose, the arithmetic average roughness Ra of the surface of the magnetic carrier preferably falls within a range of $Ra \leq D_A$ with respect to the number-average particle diameter $D_A$ of the fine particles A of the external additive for toner to be used in the present disclosure.

When the toner is mixed with the magnetic carrier to be used as a two-component developer, satisfactory results are usually obtained by setting the carrier mixing ratio at that time, as a toner concentration in the two-component developer, to preferably 2 mass % or more and 15 mass % or less, more preferably 4 mass % or more and 13 mass % or less.

<Method of Producing Toner Particle and Method of Producing Toner>

A method of producing the toner particle is not particularly limited, and a conventionally known production method, such as a suspension polymerization method, an emulsion aggregation method, a melt-kneading method, or a dissolution suspension method, may be adopted.

The toner may be obtained by mixing the resultant toner particle with the external additive for toner according to the present disclosure, and as required, any other external additive. The mixing of the toner particle with the external additive for toner according to the present disclosure and the other external additive may be performed with a mixing apparatus, such as a double cone mixer, a V-type mixer, a drum-type mixer, a super mixer, a Henschel mixer, a Nauta mixer, and MECHANO HYBRID (manufactured by Nippon Coke & Engineering Co., Ltd.), or NOBILTA (manufactured by Hosokawa Micron Corporation).

[Methods of measuring Various Physical Properties]

Methods of measuring various physical properties are described below.

<Separation of Fine Particle and Toner Particle from Toner>

The respective physical properties may be measured through use of fine particles separated from a toner by the following methods.

200 g of sucrose (manufactured by Kishida Chemical Co., Ltd.) is added to 100 mL of ion-exchanged water, and the sucrose is dissolved in the ion-exchanged water under heating with hot water to prepare a sucrose syrup. 31 g of the sucrose syrup and 6 mL of Contaminon N (10 mass % aqueous solution of a neutral detergent for washing a precision measuring device formed of a nonionic surfactant, an anionic surfactant, and an organic builder, and having a pH of 7, manufactured by Wako Pure Chemical Industries, Ltd.) are put in a tube for centrifugation to prepare a dispersion liquid. 1 g of a toner is added to the dispersion liquid, and toner clumps are loosened with a spatula or the like.

The tube for centrifugation is shaken in the above-mentioned shaker under the condition of 350 reciprocations per minute for 20 minutes. After the shaking, the solution is transferred to a glass tube (50 mL) for a swing rotor and centrifuged under the conditions of 3,500 rpm for 30 minutes in a centrifuge. In the glass tube after the centrifugation, the toner is present in a top layer, and the fine particles are present on the aqueous solution side of a lower layer. The aqueous solution in the lower layer is collected and centrifuged to be separated into the sucrose and the fine particles, to thereby collect the fine particles. As required, the centrifugation is repeated to perform separation sufficiently, and then the dispersion liquid is dried and the fine particles are collected.

When a plurality of external additives are added, the external additive of the present disclosure may be sorted through use of a centrifugation method or the like.

<Method of measuring Number-average Particle Diameter of Primary Particle of External Additive>

The number-average particle diameter of the primary particle of the external additive may be determined by measurement using a centrifugal sedimentation method. Specifically, 0.01 g of dried external additive particles are loaded into a 25 mL glass vial, and 0.2 g of a 5% Triton solution and 19.8 g of RO water are added to the vial, to thereby prepare a solution. Next, a probe (tip end in a tip end) of an ultrasonic disperser is immersed in the solution, and ultrasonic dispersion is performed at an output power of 20 W for 15 minutes, to thereby provide a dispersion liquid. Subsequently, the number-average particle diameter of the primary particle is measured by a centrifugal sedimentation particle size distribution measuring device DC24000 of CPS Instruments, Inc. through use of the dispersion liquid. The number of revolutions of a disc is set to 18,000 rpm, and a true density is set to 1.3 g/cm$^3$. Before the measurement, the device is calibrated through use of polyvinyl chloride particles having an average particle diameter of 0.476 μm.

<Method of measuring Young's modulus of External Additive>

The Young's modulus of the external additive is determined by a microcompression test using Hysitron PI 85L Picoindenter (manufactured by Bruker Corporation).

The Young's modulus (MPa) is calculated from the slope of a profile (load displacement curve) of a displacement (nm) and a test force (μN) obtained by measurement.

Device

Base system: Hysitron PI 85L

Measurement indenter: circular flat-end indenter having a diameter of 1 μm

Used SEM: Thermo Fisher Versa 3D

SEM conditions: −10° tilt, 13 pA at 10 keV

Measurement Conditions

Measurement mode: displacement control

Maximum displacement: 30 nm

Displacement rate: 1 nm/sec

Retention time: 2 sec

Unloading rate: 5 nm/sec

Analysis Method

The Hertz analysis is applied to a curve obtained at the time of compression by from 0 nm to 10 nm in the resultant load displacement curve, to thereby calculate the Young's modulus of the fine particles.

Sample Preparation

Fine particles adhering to a silicon wafer

<Method of acquiring Image of External Additive Particle>

An image of each of external additive particles is acquired with a Hitachi ultra-high resolution field-emission scanning electron microscope S-4800 (manufactured by Hitachi High-Technologies Corporation).

(1) Production of Sample

An electroconductive paste is thinly applied to a sample stage (aluminum sample stage: 15 mm×6 mm), and external additive particles are sprayed onto the conductive paste. Further, air blowing is performed to remove excess external additive particles from the sample stage, to thereby sufficiently dry the sample stage. The sample stage is set on a sample holder, and the height of the sample stage is adjusted to 36 mm with a sample height gauge.

(2) S-4800 Observation Condition Setting

Liquid nitrogen is injected into an anti-contamination trap mounted to a housing of S-4800 until the liquid nitrogen overflows, and the resultant is allowed to stand for 30 minutes. "PC-SEM" of S-4800 is activated to perform flashing (cleaning of an FE chip that is an electron source). An acceleration voltage display part of a control panel on the screen is clicked, and a [Flashing] button is pressed, to thereby open a flashing execution dialog. The flashing intensity is recognized to be 2, and the flashing is performed. The emission current by the flashing is recognized to be from 20 μA to 40 μA. The sample holder is inserted into a sample chamber of the housing of S-4800. An [Origin] button of the control panel is pressed to move the sample holder to an observation position.

The acceleration voltage display part is clicked to open an HV setting dialog. The acceleration voltage is set to [1.1 kV], and the emission current is set to [20 μA]. In a [Basic] tab of an operation panel, signal selection is set to [SE]. [Upper (U)] and [+BSE] for an SE detector are selected, and [L.A.100] is selected in a selection box on the right side of the [+BSE] to set a mode for observation in a backscattered electron image. Similarly, in the [Basic] tab of the operation panel, the probe current in an electron optical system condition block is set to [Normal], the focus mode is set to [UHR], and the WD is set to [4.5 mm]. An [ON] button in the acceleration voltage display part of the control panel is pressed to apply an acceleration voltage.

(3) Focus Adjustment

The focus knob [COARSE] of the operation panel is turned, and the aperture alignment is adjusted when the focusing is achieved to some extent. The [Align] of the control panel is clicked to display the alignment dialog, and the [Beam] is selected. The STIGMA/ALIGNMENT knobs (X and Y) of the operation panel are turned to move a displayed beam to the center of a concentric circle. Next, the [Aperture] is selected, and the STIGMA/ALIGNMENT knobs (X and Y) are turned one by one, to thereby make adjustment so as to stop the movement of an image or minimize the movement. The aperture dialog is closed, and the image is brought into focus with an autofocus. After that, the magnification is set to 50,000 (50 k) times, focus adjustment is performed through use of the focus knob and the STIGMA/ALIGNMENT knobs in the same manner as above, and the image is brought into focus with an autofocus again. This operation is repeated again to bring the image into focus. Here, when the inclination angle of an observation surface is large, the measurement accuracy of the coating ratio becomes liable to be lowered. Accordingly, at the time of focus adjustment, adjustment is selected so that the entire observation surface is simultaneously brought into focus, to thereby select and analyze the observation surface having minimum inclination.

(4) Image Saving

Brightness is adjusted in an ABC mode, and a photograph is taken and saved with a size of 640×480 pixels. The following analysis is performed through use of this image file. Images are obtained for at least 25 external additive particles.

<Method of Measuring Number-Average Particle Diameter $D_A$ and Average Circularity of Fine Particles A>

The number-average particle diameter $D_A$ and average circularity of the fine particles A are measured from the images of the external additive particles acquired by the above-mentioned method.

First, a Bezier curve is drawn so as to follow a contour portion of a base particle of the external additive particle to define a contour of the fine particle A. The contour is drawn so as to interpolate a range in which the fine particles B are present on the surface of the fine particle A and the outer diameter portion is unclear. The maximum diameter of the contour of the fine particle A defined by the above-mentioned method is measured. In addition, the circularity is measured from the defined contour of the fine particle A. Twenty external additive particles were analyzed, and average values thereof were defined as the $D_A$ and the value of circularity in the present disclosure.

<Determination of Presence or Absence of Contact Point between Convex Closure of External Additive Particle and Contour of Fine Particle A>

A projection image of the external additive particle is obtained from the image of the external additive particle acquired by the above-mentioned method, and a line that convexly closes the projection image is drawn. The line that convexly closes the projection image thus obtained and the contour of the fine particle A created by the above-mentioned method are compared to each other to determine whether or not there are portions in which the two lines overlap each other. Twenty external additive particles are analyzed, and when there are overlapping portions in more than half of the external additive particles, it is determined that "contact points are present." This is because of the following reason. There appears to be no contact point in some cases depending on the observation angle of the external additive particle. Thus, it is conceived that the effect of the present disclosure is sufficiently obtained when the contact points are recognized in more than half of the external additive fine particles.

<Method of measuring Number-average Particle Diameter $D_B$ of Fine Particles B and Calculation of $D_B/D_A$>

The number-average particle diameter $D_B$ of the fine particles B is measured from the images of the external additive particles acquired by the above-mentioned method.

Assuming that the fine particle B has a substantially spherical shape, the contour portion of the fine particle B that protrudes from the fine particle A is subjected to fitting with a circle. The diameter of the circle with which the fitting is performed is measured and defined as the diameter of the fine particle B. Twenty fine particles B were analyzed, and an average value thereof was defined as the value of the $D_B$ in the present disclosure. The $D_B/D_A$ is calculated from the above-mentioned number-average particle diameter $D_A$ of the fine particles A and the number-average particle diameter $D_B$ of the fine particles B.

<Method of measuring Average Number Na of Fine Particles B per External Additive Particle>

The average number Na of the fine particles B per external additive particle is measured from the images of the external additive particles acquired by the above-mentioned method.

The number of the protruding fine particles B of the external additive particle is counted, and the number multiplied by two is defined as the number of the fine particles B per external additive particle. This is because it is assumed that the same number of the fine particles B are present also on the back side of the external additive particle that has not been observed. Twenty external additive particles were analyzed, and an average value thereof was defined as the value of the NA in the present disclosure.

<Method of Measuring Embedding Ratio of Fine Particle B>

An external additive is sufficiently dispersed in a visible light-curable resin (product name: Aronix LCR series D-800, manufactured by Toagosei Co., Ltd.), followed by irradiation with short-wavelength light to cause curing. The resultant cured product is cut with an ultramicrotome including a diamond knife to produce a 250 nm sliced sample. Then, the sliced sample is magnified with a transmission electron microscope (electron microscope JEM-2800, manufactured by JEOL Ltd.) (TEM-EDX) at a magnification of from 40,000 times to 50,000 times to observe the cross-section of the external additive. From the cross-section image, the diameter of the fine particle B and the depth of the fine particle B embedded in the fine particle A are measured. For each particle of the external additive, five particles of the fine particles B are selected at random, and the embedding ratio of each of the fine particles B is calculated by the following expression. In addition, twenty or more of the external additive particles were analyzed, and an average value thereof was defined as the embedding ratio of the fine particle B.

Embedding ratio (%) of fine particle $B$=(depth of fine particle $B$ embedded in fine particle $A$/diameter of fine particle $B$)×100

<Method of Measuring Content Ratios of Constituent Compounds in Fine Particle a by Solid-State $^{29}$Si-NMR>

In solid-state $^{29}$Si-NMR, peaks are detected in different shift regions depending on the structures of functional groups that are bonded to Si in constituent compounds. The structures that are bonded to Si may be identified by identifying each of peak positions through use of a standard sample. The abundance ratio of each of the constituent compounds may be calculated from the resultant peak area. The ratios of the peak areas of an M-unit structure, a D-unit structure (c), a T-unit structure (b), and a Q-unit structure (a) to the total peak area can be determined by calculation.

Measurement conditions for solid-state $^{29}$Si-NMR are specifically as described below.

Apparatus: JNM-ECX5002 (JEOL RESONANCE)
Temperature: room temperature
Measurement method: DDMAS method $^{29}$Si 45°
Sample tube: zirconia 3.2 mmφ
Sample: loaded into a test tube under a powder state
Sample rotation speed: 10 kHz
Relaxation delay: 180 s
Scan: 2,000

After the measurement, a plurality of silane components having different substituents and linking groups in the sample (fine particle A) are subjected to peak separation by curve fitting into the M-unit structure, the D-unit structure (the following unit (c)), the T-unit structure (the following unit (b)), and the Q-unit structure (the following unit (a)), and each peak area is calculated.

(a)

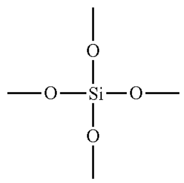

-continued (b)

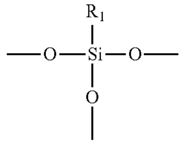

(c)

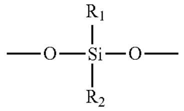

The curve fitting is performed through use of EXcalibur for Windows (trademark) version 4.2 (EX series) that is software for JNM-EX 400 manufactured by JEOL Ltd. “1D Pro” is clicked from menu icons to read measurement data. Next, “Curve fitting function” is selected from “Command” of a menu bar, and curve fitting is performed. Curve fitting for each component is performed so that the difference (synthetic peak difference) between a synthesized peak obtained by synthesizing each peak obtained by curve fitting and the peak of the measurement result becomes smallest.

The ratio a peak area corresponding to the structure (a) with respect to the peak area of all silicon atoms in the fine particle A is determined, and the resultant is defined as the content ratio of the unit (a). Similarly, a peak area corresponding to the structure (b), and a peak area corresponding to the structure (c) are determined, and the content ratios of the unit (b) and unit (c) are determined therefrom. When it is required to recognize the structures in more detail, the measurement results of $^{13}$C-NMR and $^{1}$H-NMR may be identified together with the measurement results of $^{29}$Si-NMR.

<Method of Measuring Surface Treatment Agent of External Additive>

A surface treatment agent for the external additive is analyzed by pyrolysis gas chromatography mass spectrometry (GC-MS).

Measurement conditions are specifically as described below.

Device: GC6890A (manufactured by Agilent Technologies), pyrolyzer (manufactured by
Japan Analytical Industry Co., Ltd.)
Column: HP-5 ms 30 m
Pyrolysis temperature: 590° C.

The surface treatment agent for the external additive is identified by identifying each peak position in a profile obtained by measurement through use of a standard sample.

<Method of Measuring Weight-Average Particle Diameter (D4) of Toner Particle>

The weight-average particle diameter (D4) of the toner particle is measured with the number of effective measurement channels of 25,000 by using a precision particle size distribution-measuring apparatus based on a pore electrical resistance method provided with a 100 μm aperture tube “Coulter Counter Multisizer 3” (trademark, manufactured by Beckman Coulter, Inc.) and dedicated software included therewith “Beckman Coulter Multisizer 3 Version 3.51” (manufactured by Beckman Coulter, Inc.) for setting measurement conditions and analyzing measurement data. Then, the measurement data is analyzed to calculate the diameter.

An electrolyte aqueous solution prepared by dissolving special-grade sodium chloride in ion-exchanged water so as to have a concentration of about 1 mass %, such as "ISOTON II" (manufactured by Beckman Coulter, Inc.), may be used in the measurement.

The dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm or more and 60 μm or less.

A specific measurement method is as described below.

(1) About 200 ml of the electrolyte aqueous solution is charged into a 250 mL round-bottom beaker made of glass dedicated for the Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "aperture tube flush" function of the dedicated software.

(2) About 30 mL of the electrolyte aqueous solution is charged into a 100-mL flat-bottom beaker made of glass. About 0.3 mL of a diluted solution prepared by diluting "Contaminon N" (a 10 mass % aqueous solution of a neutral detergent for washing a precision measuring device formed of a nonionic surfactant, an anionic surfactant, and an organic builder and having a pH of 7 manufactured by Wako Pure Chemical Industries, Ltd.) with ion-exchanged water by three mass fold is added as a dispersant to the electrolyte aqueous solution.

(3) A predetermined amount of ion-exchanged water is charged into the water tank of an ultrasonic dispersing unit "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 ml of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted so that the resonance state of the liquid level of the electrolyte aqueous solution in the beaker is maximized.

(5) About 10 mg of toner is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted to 10° C. or more and 40° C. or less in the ultrasonic dispersion.

(6) The electrolyte aqueous solution in the section (5) in which the toner has been dispersed is dropped with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) is calculated. An "average diameter" on the "analysis/volume statistics (arithmetic average)" screen of the dedicated software when the dedicated software is set to show a graph in a vol % unit is the weight-average particle diameter (D4).

EXAMPLES

The present disclosure is more specifically described with reference to Examples described below. However, the present disclosure is by no means limited to these Examples. The "part(s)" in the following formulations are all on a mass basis unless otherwise stated.

Production Example of External Additive 1 for Toner

1. Hydrolysis and Polycondensation Steps:

(1) 21.6 g of RO water, 135.0 g of methanol, 0.004 g of acetic acid serving as a catalyst, and 12.2 g of dimethoxydimethylsilane were loaded into a 500 ml beaker and stirred at 45° C. for 5 minutes.

(2) 2.0 g of 28% ammonia water, 15.0 g of tetraethoxysilane, and 6.5 g of a colloidal silica aqueous dispersion liquid A (silica solid content: 40 mass %, number-average particle diameter of silica fine particles: 40 nm) were added to the resultant, followed by stirring at 30° C. for 3.0 hours, to thereby provide a raw material solution.

2. Particle Forming Step:

120.0 g of RO water was loaded into a 1,000 ml beaker, and the raw material solution obtained through "1. Hydrolysis and Polycondensation Steps" described above was added dropwise over 5 minutes into the water under stirring at 25° C. After that, the mixed liquid was increased in temperature to 60° C. and stirred for 1.5 hours while the temperature was kept at 60° C., to thereby provide a dispersion liquid of external additive fine particles.

3. Hydrophobizing Step:

6.0 g of hexamethyldisilazane was added as a hydrophobizing agent to the dispersion liquid of the external additive fine particles obtained through the particle forming step described above, and the mixture was stirred at 60° C. for 3.0 hours. After the resultant was left to stand still for 5 minutes, powder precipitated in a lower part of the solution was recovered by suction filtration and dried under reduced pressure at 120° C. for 24 hours, to thereby provide an external additive 1 for toner. The number-average particle diameter of the fine particles A of the external additive 1 for toner was 0.10 μm.

Production Example of External Additive 2 for Toner

An external additive 2 for toner was obtained in the same manner as in the production example of the external additive 1 for toner except that 4.0 g of a colloidal silica aqueous dispersion liquid C (silica solid content: 40 mass %, number-average particle diameter of silica fine particles: 10 nm) was used instead of 6.5 g of the colloidal silica aqueous dispersion liquid A, the amount of 28% ammonia water was changed to 1.0 g, and the stirring temperature was changed to 50° C. in (2) of the hydrolysis and polycondensation steps described above.

Production Example of External Additive 3 for Toner

An external additive 3 for toner was obtained in the same manner as in the production example of the external additive 1 for toner except that 5.0 g of a colloidal silica aqueous dispersion liquid B (silica solid content: 40 mass %, number-average particle diameter of silica fine particles: 20 nm) was used instead of 6.5 g of the colloidal silica aqueous dispersion liquid A, the amount of 28% ammonia water was changed to 1.0 g, and the stirring temperature was changed to 40° C. in (2) of the hydrolysis and polycondensation steps described above.

Production Example of External Additive 4 for Toner

An external additive 4 for toner was obtained in the same manner as in the production example of the external additive 1 for toner except that the amount of the colloidal silica aqueous dispersion liquid A was changed to 9.0 g, the amount of 28% ammonia water was changed to 1.0 g, and the stirring temperature was changed to 40° C. in (2) of the hydrolysis and polycondensation steps described above.

Production Example of External Additive 5 for Toner

An external additive 5 for toner was obtained in the same manner as in the production example of the external additive 1 for toner except that the amount of the colloidal silica aqueous dispersion liquid A was changed to 9.0 g, the amount of 28% ammonia water was changed to 1.5 g, and the stirring temperature was changed to 40° C. in (2) of the hydrolysis and polycondensation steps described above.

Production Example of External Additive 6 for Toner

An external additive 6 for toner was obtained in the same manner as in the production example of the external additive 1 for toner except that the amount of the colloidal silica aqueous dispersion liquid A was changed to 1.0 g, the amount of 28% ammonia water was changed to 3.0 g, and the stirring temperature was changed to 25° C. in (2) of the hydrolysis and polycondensation steps described above.

Production Example of External Additive 7 for Toner

An external additive 7 for toner was obtained in the same manner as in the production example of the external additive 1 for toner except that the amount of the colloidal silica aqueous dispersion liquid A was changed to 6.5 g and the stirring time was changed to 1.8 hours in (2) of the hydrolysis and polycondensation steps described above.

Production Example of External Additive 8 for Toner

An external additive 8 for toner was obtained in the same manner as in the production example of the external additive 1 for toner except that the amount of the colloidal silica aqueous dispersion liquid A was changed to 7.5 g and the stirring time was changed to 2.5 hours in (2) of the hydrolysis and polycondensation steps described above.

Production Example of External Additive 9 for Toner

An external additive 9 for toner was obtained in the same manner as in the production example of the external additive 1 for toner except that the amount of the colloidal silica aqueous dispersion liquid A was changed to 8.5 g and the stirring time was changed to 3.4 hours in (2) of the hydrolysis and polycondensation steps described above.

Production Example of External Additive 10 for Toner

An external additive 10 for toner was obtained in the same manner as in the production example of the external additive 1 for toner except that the amount of the colloidal silica aqueous dispersion liquid A was changed to 14.0 g in (2) of the hydrolysis and polycondensation steps described above.

Production Example of External Additive 11 for Toner

An external additive 11 for toner was obtained in the same manner as in the production example of the external additive 1 for toner except that the amount of the colloidal silica aqueous dispersion liquid A was changed to 3.5 g in (2) of the hydrolysis and polycondensation steps described above.

Production Example of External Additive 12 for Toner

An external additive 12 for toner was obtained in the same manner as in the production example of the external additive 1 for toner except that 8.1 g of trimethoxymethylsilane was added without adding dimethoxydimethylsilane in (1) of the hydrolysis and polycondensation steps described above, and the amount of the colloidal silica aqueous dispersion liquid A was changed to 5.5 g and the amount of tetraethoxysilane was changed to 19.1 g in (2) thereof.

Production Example of External Additive 13 for Toner

An external additive 13 for toner was obtained in the same manner as in the production example of the external additive 1 for toner except that 5.4 g of trimethoxymethylsilane was added without adding dimethoxydimethylsilane in (1) of the hydrolysis and polycondensation steps described above, and the amount of the colloidal silica aqueous dispersion liquid A was changed to 5.5 g and the amount of tetraethoxysilane was changed to 21.8 g in (2) thereof.

Production Example of External Additive 14 for Toner

An external additive 14 for toner was obtained in the same manner as in the production example of the external additive 1 for toner except that the amount of dimethoxydimethylsilane was changed to 5.4 g in (1) of the hydrolysis and polycondensation steps described above, and the amount of the colloidal silica aqueous dispersion liquid A was changed to 7.0 g, the amount of tetraethoxysilane was changed to 8.2 g, and 13.6 g of trimethoxymethylsilane was added in (2) thereof.

Production Example of External Additive 15 for Toner

An external additive 15 for toner was obtained in the same manner as in the production example of the external additive 1 for toner except that 25.3 g of trimethoxymethylsilane was added without adding dimethoxydimethylsilane in (1) of the hydrolysis and polycondensation steps described above, and the amount of the colloidal silica aqueous dispersion liquid A was changed to 7.0 g and the amount of tetraethoxysilane was changed to 1.9 g in (2) thereof.

For Comparative Examples

Production Example of External Additive 16 for Toner

An external additive 16 for toner was obtained in the same manner as in the production example of the external additive 1 for toner except that 14.0 g of the colloidal silica aqueous dispersion liquid C was used instead of 6.5 g of the colloidal silica aqueous dispersion liquid A, the amount of 28% ammonia water was changed to 1.0 g, and the stirring temperature was changed to 55° C. in (2) of the hydrolysis and polycondensation steps described above.

Production Example of External Additive 17 for Toner

An external additive 17 for toner was obtained in the same manner as in the production example of the external additive 1 for toner except that the amount of the colloidal silica aqueous dispersion liquid A was changed to 0.7 g, the amount of 28% ammonia water was changed to 3.5 g, and the stirring temperature was changed to 25° C. in (2) of the hydrolysis and polycondensation steps described above.

Production Example of External Additive 18 for Toner

An external additive 18 for toner was obtained in the same manner as in the production example of the external additive 1 for toner except that 0.4 g of the colloidal silica aqueous dispersion liquid C was used instead of 6.5 g of the colloidal silica aqueous dispersion liquid A, the amount of 28% ammonia water was changed to 3.5 g, and the stirring temperature was changed to 25° C. in (2) of the hydrolysis and polycondensation steps described above.

Production Example of External Additive 19 for Toner

An external additive 19 for toner was obtained in the same manner as in the production example of the external additive 1 for toner except that the amount of the colloidal silica aqueous dispersion liquid A was changed to 17.0 g, the amount of 28% ammonia water was changed to 3.5 g, and the stirring temperature was changed to 25° C. in (2) of the hydrolysis and polycondensation steps described above.

Production Example of External Additive 20 for Toner

1. Hydrolysis and Polycondensation Steps:
   (1) 21.6 g of RO water, 135.0 g of methanol, 0.004 g of acetic acid serving as a catalyst, and 12.2 g of dimethoxydimethylsilane were loaded into a 500 ml beaker and stirred at 45° C. for 5 minutes.
   (2) 2.0 g of 28% ammonia water and 15.0 g of tetraethoxysilane were added to the resultant, followed by stirring at 30° C. for 2.0 hours.
   (3) Then, 5.5 g of the colloidal silica aqueous dispersion liquid A was added to the resultant, followed by stirring for 20 minutes, to thereby provide a raw material solution.
2. Particle Forming Step:

120.0 g of RO water was loaded into a 1,000 mL beaker, and the raw material solution obtained through the hydrolysis and polycondensation steps described above was added dropwise over 5 minutes into the water under stirring at 25° C. After that, the mixed liquid was increased in temperature to 60° C. and stirred for 1.5 hours while the temperature was kept at 60° C., to thereby provide a dispersion liquid of external additive fine particles.

3. Hydrophobizing Step:

6.0 g of hexamethyldisilazane was added as a hydrophobizing agent to the dispersion liquid of the external additive fine particles obtained in the particle forming step described above, and the mixture was stirred at 60° C. for 3.0 hours. After the resultant was left to stand still for 5 minutes, powder precipitated in a lower part of the solution was recovered by suction filtration and dried under reduced pressure at 120° C. for 24 hours, to thereby provide an external additive 20 for toner.

Production Example of External Additive 21 for Toner

An external additive 21 for toner was obtained in the same manner as in the production example of the external additive 1 for toner except that the amount of the colloidal silica aqueous dispersion liquid A was changed to 7.5 g and the stirring time was changed to 3.5 hours in (2) of the hydrolysis and polycondensation steps described above.

Production Example of External Additive 22 for Toner

An external additive 22 for toner was obtained in the same manner as in the production example of the external additive 1 for toner except that the amount of the colloidal silica aqueous dispersion liquid A was changed to 10.0 g in (2) of the hydrolysis and polycondensation steps described above.

Production Example of External Additive 23 for Toner

An external additive 23 for toner was obtained in the same manner as in the production example of the external additive 1 for toner except that the amount of RO water was changed to 60.0 g in the particle forming step described above.

Production Example of External Additive 24 for Toner 18.7 g of a colloidal silica dispersion liquid (silica solid content: 40 mass %, number-average particle diameter of silica fine particles: 30 nm), 125 mL of DT water, and 16.5 g (0.066 mol) of methacryloxypropyl-trimethoxysilane were loaded into a 250 mL four-necked round-bottom flask including an overhead stirring motor, a condenser, and a thermocouple. The temperature was increased to 65° C., and the mixture was stirred at 120 rpm. Nitrogen gas was bubbled through this mixture for 30 minutes. After 3 hours, 0.16 g of a 2,2'-azobisisobutyronitrile radical initiator dissolved in 10 mL of ethanol was added to the resultant, and the temperature was increased to 75° C.

Radical polymerization was allowed to proceed for 5 hours, and then 3 mL of 1,1,1,3,3,3-hexamethyldisilazane was added to the mixture. The reaction was allowed to proceed for another 3 hours. The final mixture was filtered through a 170-mesh sieve to remove any coagulates, and the dispersion liquid was dried overnight at 120° C. in a Pyrex (trademark) dish to provide an external additive 24 for toner.

Production Example of External Additive 25 for Toner 200.0 g of deionized water and 3.0 g of sodium lauryl sulfate were loaded into a glass reactor including a thermometer, a reflux cooler, a nitrogen gas introduction tube, and a stirrer, and heated to from 80° C. to 85° C. with nitrogen gas ventilation. 1.0 g of ammonium persulfate was added to the mixture under stirring, and then a monomer mixture containing 40.0 g of methyl methacrylate and 40.0 g of styrene that were non-crosslinking monomers, 20.0 g of divinylbenzene that was a crosslinking monomer, and 6.5 g of the colloidal silica aqueous dispersion liquid A was added dropwise over 1 hour, followed by continuous stirring for 1 hour. The emulsion thus obtained was dried by spray drying to provide an external additive 25 for toner.

The physical properties of each of the external additives 1 to 25 for toner obtained above are shown in Table 1.

TABLE 1-1

| External additive for toner No. | Number-average particle diameter of fine particle A $D_A$[μm] | Number-average particle diameter of fine particle B $D_B$[μm] | $D_B/D_A$ | Embedding ratio of fine particle B [%] | Average circularity of fine particle A | Contact point between convex closure and contour of fine particle A | Number $N_B$ of Fine Particles B | Composition of fine particle A (a) | (b) | (c) |
|---|---|---|---|---|---|---|---|---|---|---|
| External additive 1 for toner | 0.10 | 0.04 | 0.40 | 65 | 0.95 | Present | 4.4 | 0.39 | 0.00 | 0.61 |
| External additive 2 for toner | 0.03 | 0.01 | 0.33 | 65 | 0.95 | Present | 5.0 | 0.39 | 0.00 | 0.61 |
| External additive 3 for toner | 0.06 | 0.02 | 0.33 | 65 | 0.95 | Present | 5.0 | 0.39 | 0.00 | 0.61 |
| External additive 4 for toner | 0.07 | 0.04 | 0.57 | 65 | 0.95 | Present | 2.5 | 0.39 | 0.00 | 0.61 |
| External additive 5 for toner | 0.08 | 0.04 | 0.50 | 65 | 0.95 | Present | 3.0 | 0.39 | 0.00 | 0.61 |
| External additive 6 for toner | 0.30 | 0.04 | 0.13 | 65 | 0.95 | Present | 20.0 | 0.39 | 0.00 | 0.61 |
| External additive 7 for toner | 0.10 | 0.04 | 0.40 | 30 | 0.95 | Present | 5.0 | 0.39 | 0.00 | 0.61 |
| External additive 8 for toner | 0.10 | 0.04 | 0.40 | 50 | 0.95 | Present | 5.0 | 0.39 | 0.00 | 0.61 |
| External additive 9 for toner | 0.10 | 0.04 | 0.40 | 80 | 0.95 | Present | 5.0 | 0.39 | 0.00 | 0.61 |
| External additive 10 for toner | 0.10 | 0.04 | 0.40 | 65 | 0.95 | Present | 8.0 | 0.39 | 0.00 | 0.61 |
| External additive 11 for toner | 0.10 | 0.04 | 0.40 | 65 | 0.95 | Present | 2.5 | 0.39 | 0.00 | 0.61 |
| External additive 12 for toner | 0.10 | 0.04 | 0.40 | 65 | 0.95 | Present | 4.4 | 0.58 | 0.42 | 0.00 |
| External additive 13 for toner | 0.10 | 0.04 | 0.40 | 65 | 0.95 | Present | 4.4 | 0.70 | 0.30 | 0.00 |
| External additive 14 for toner | 0.10 | 0.04 | 0.40 | 65 | 0.95 | Present | 4.4 | 0.20 | 0.55 | 0.25 |
| External additive 15 for toner | 0.10 | 0.04 | 0.40 | 65 | 0.95 | Present | 4.4 | 0.04 | 0.96 | 0.00 |
| External additive 16 for toner | 0.02 | 0.01 | 0.50 | 65 | 0.95 | Present | 4.0 | 0.39 | 0.00 | 0.61 |
| External additive 17 for toner | 0.35 | 0.40 | 1.14 | 65 | 0.95 | Present | 25.0 | 0.39 | 0.00 | 0.61 |
| External additive 18 for toner | 0.12 | 0.01 | 0.08 | 65 | 0.95 | Present | 35.0 | 0.39 | 0.00 | 0.61 |
| External additive 19 for toner | 0.06 | 0.04 | 0.67 | 50 | 0.95 | Present | 2.0 | 0.39 | 0.00 | 0.61 |
| External additive 20 for toner | 0.10 | 0.04 | 0.40 | 25 | 0.95 | Present | 4.4 | 0.39 | 0.00 | 0.61 |
| External additive 21 for toner | 0.10 | 0.04 | 0.40 | 85 | 0.95 | Present | 4.4 | 0.39 | 0.00 | 0.61 |
| External additive 22 for toner | 0.10 | 0.04 | 0.40 | 65 | 0.95 | Absent | 9.0 | 0.39 | 0.00 | 0.61 |

TABLE 1-1-continued

| External additive for toner No. | Number-average particle diameter of fine particle A $D_A$[μm] | Number-average particle diameter of fine particle B $D_B$[μm] | $D_B/D_A$ | Embedding ratio of fine particle B [%] | Average circularity of fine particle A | Contact point between convex closure and contour of fine particle A | Number $N_B$ of Fine Particles B | Composition of fine particle A (a) | (b) | (c) |
|---|---|---|---|---|---|---|---|---|---|---|
| External additive 23 for toner | 0.18 | 0.04 | 0.22 | 65 | 0.85 | Present | 4.4 | 0.39 | 0.00 | 0.61 |
| External additive 24 for toner | 0.10 | 0.03 | 0.30 | 65 | 0.95 | Absent | 15.0 | — | — | — |
| External additive 25 for toner | 0.10 | 0.04 | 0.40 | 65 | 0.95 | Present | 4.4 | — | — | — |

TABLE 1-2

| External additive for toner No. | Expression (3-1) | Expression (3-2) | Expression (4-1) | Expression (4-2) | Expression (4-3) |
|---|---|---|---|---|---|
| External additive 1 for toner | 1.00 | 0.61 | 0.39 | 0.00 | 0.61 |
| External additive 2 for toner | 1.00 | 0.61 | 0.39 | 0.00 | 0.61 |
| External additive 3 for toner | 1.00 | 0.61 | 0.39 | 0.00 | 0.61 |
| External additive 4 for toner | 1.00 | 0.61 | 0.39 | 0.00 | 0.61 |
| External additive 5 for toner | 1.00 | 0.61 | 0.39 | 0.00 | 0.61 |
| External additive 6 for toner | 1.00 | 0.61 | 0.39 | 0.00 | 0.61 |
| External additive 7 for toner | 1.00 | 0.61 | 0.39 | 0.00 | 0.61 |
| External additive 8 for toner | 1.00 | 0.61 | 0.39 | 0.00 | 0.61 |
| External additive 9 for toner | 1.00 | 0.61 | 0.39 | 0.00 | 0.61 |
| External additive 10 for toner | 1.00 | 0.61 | 0.39 | 0.00 | 0.61 |
| External additive 11 for toner | 1.00 | 0.61 | 0.39 | 0.00 | 0.61 |
| External additive 12 for toner | 1.00 | 0.42 | 0.58 | 0.42 | 0.00 |
| External additive 13 for toner | 1.00 | 0.30 | 0.70 | 0.30 | 0.00 |
| External additive 14 for toner | 1.00 | 0.80 | 0.20 | 0.55 | 0.25 |
| External additive 15 for toner | 1.00 | 0.96 | 0.04 | 0.96 | 0.00 |
| External additive 16 for toner | 1.00 | 0.61 | 0.39 | 0.00 | 0.61 |
| External additive 17 for toner | 1.00 | 0.61 | 0.39 | 0.00 | 0.61 |
| External additive 18 for toner | 1.00 | 0.61 | 0.39 | 0.00 | 0.61 |
| External additive 19 for toner | 1.00 | 0.61 | 0.39 | 0.00 | 0.61 |
| External additive 20 for toner | 1.00 | 0.61 | 0.39 | 0.00 | 0.61 |
| External additive 21 for toner | 1.00 | 0.61 | 0.39 | 0.00 | 0.61 |
| External additive 22 for toner | 1.00 | 0.61 | 0.39 | 0.00 | 0.61 |
| External additive 23 for toner | 1.00 | 0.61 | 0.39 | 0.00 | 0.61 |
| External additive 24 for toner | — | — | — | — | — |
| External additive 25 for toner | — | — | — | — | — |

Production Example of Polyester Resin A1

| | |
|---|---|
| Polyoxypropylene(2.2)-2,2-bis(4-hydroxyphenyl)propane | 76.9 parts (0.167 part by mole) |
| Terephthalic acid (TPA) | 25.0 parts (0.145 part by mole) |
| Adipic acid | 8.0 parts (0.054 part by mole) |
| Titanium tetrabutoxide | 0.5 part |

The above-mentioned materials were loaded into a four-necked 4-liter flask made of glass, and a temperature gauge, a stirring rod, a capacitor, and a nitrogen introduction tube were mounted on the flask. The resultant flask was placed in a mantle heater. Next, the inside of the flask was purged with a nitrogen gas, and then the temperature was gradually increased under stirring. The materials were subjected to a reaction for 4 hours under stirring at a temperature of 200° C. (first reaction step). After that, 1.2 parts (0.006 part by mole) of trimellitic anhydride (TMA) was added to the resultant, and the mixture was subjected to a reaction at 180° C. for 1 hour (second reaction step), to thereby provide a polyester resin A1 as a binder resin component. The polyester resin A1 had an acid value of 5 mgKOH/g.

Production Example of Polyester Resin A2

| | |
|---|---|
| Polyoxypropylene(2.2)-2,2-bis(4-hydroxyphenyl)propane | 71.3 parts (0.155 part by mole) |
| Terephthalic acid | 24.1 parts (0.145 part by mole) |
| Titanium tetrabutoxide | 0.6 part |

The above-mentioned materials were loaded into a four-necked 4-liter flask made of glass, and a temperature gauge, a stirring rod, a capacitor, and a nitrogen introduction tube were mounted on the flask. The resultant flask was placed in a mantle heater. Next, the inside of the flask was purged with a nitrogen gas, and then the temperature was gradually increased under stirring. The materials were subjected to a reaction for 2 hours under stirring at a temperature of 200° C. After that, 5.8 parts (0.030 part by mole) of trimellitic anhydride was added to the resultant, and the mixture was subjected to a reaction at 180° C. for 10 hours, to thereby provide a polyester resin A2 as a binder resin component. The polyester resin A2 had an acid value of 10 mg KOH/g.

Production Example of Toner Particles 1

| | |
|---|---|
| Polyester resin A1 | 70.0 parts |
| Polyester resin A2 | 30.0 parts |
| Fischer-Tropsch wax (peak temperature at maximum endothermic peak: 78° C.) | 5.0 parts |
| C.I. Pigment Blue 15:3 | 5.0 parts |
| Aluminum 3,5-di-t-butylsalicylate compound | 0.1 part |

The raw materials shown in the above-mentioned formulation were mixed with a Henschel mixer (Model FM-75, manufactured by Nippon Coke & Engineering Co., Ltd.) at a number of revolutions of 20 s' for a time of revolution of 5 minutes. After that, the mixture was kneaded with a twin screw kneader (Model PCM-30 manufactured by Ikegai Corp.) set to a temperature of 125° C. and a number of revolutions of 300 rpm. The resultant kneaded product was cooled and coarsely pulverized with a hammer mill to a diameter of 1 mm or less, to thereby provide a coarsely pulverized product. The resultant coarsely pulverized product was finely pulverized with a mechanical pulverizer (T-250, manufactured by Freund-Turbo Corporation). Further, the finely pulverized product was classified with a rotary classifier (200TSP, manufactured by Hosokawa Micron Corporation) to provide toner particles 1. The operating condition of the rotary classifier (200TSP, manufactured by Hosokawa Micron Corporation) was as follows: classification was performed at a number of revolutions of a classification rotor of 50.0 $s^{-1}$. The resultant toner particles 1 had a weight-average particle diameter (D4) of 5.9 μm.

Production Example of Toner 1

| | |
|---|---|
| Toner particles 1 | 100 parts |
| External additive 1 for toner | 6.0 parts |

The above-mentioned materials were mixed with a Henschel mixer Model FM-10C (manufactured by Mitsui Miike Chemical Engineering Machinery, Co., Ltd.) at a number of revolutions of 30 $s^{-1}$ for a time of revolution of 10 min to provide a toner 1.

Production Examples of Toners 2 to 29

Toners 2 to 29 were obtained by performing production in the same manner as in the production example of the toner 1 except that the external additive for toner and the addition amount thereof were changed as shown in Table 2.

TABLE 2

| Toner No. | Toner particle No. | External additive for toner No. | External additive for toner Addition amount (part) |
|---|---|---|---|
| Toner 1 | Toner particle 1 | External additive 1 for toner | 6.0 |
| Toner 2 | Toner particle 1 | External additive 2 for toner | 6.0 |
| Toner 3 | Toner particle 1 | External additive 3 for toner | 6.0 |
| Toner 4 | Toner particle 1 | External additive 4 for toner | 6.0 |
| Toner 5 | Toner particle 1 | External additive 5 for toner | 6.0 |
| Toner 6 | Toner particle 1 | External additive 6 for toner | 6.0 |
| Toner 7 | Toner particle 1 | External additive 7 for toner | 6.0 |
| Toner 8 | Toner particle 1 | External additive 8 for toner | 6.0 |
| Toner 9 | Toner particle 1 | External additive 9 for toner | 6.0 |
| Toner 10 | Toner particle 1 | External additive 10 for toner | 6.0 |
| Toner 11 | Toner particle 1 | External additive 11 for toner | 6.0 |
| Toner 12 | Toner particle 1 | External additive 12 for toner | 6.0 |
| Toner 13 | Toner particle I | External additive 13 for toner | 6.0 |
| Toner 14 | Toner particle 1 | External additive 14 for toner | 6.0 |
| Toner 15 | Toner particle 1 | External additive 15 for toner | 6.0 |
| Toner 16 | Toner particle 1 | External additive 1 for toner | 0.05 |
| Toner 17 | Toner particle 1 | External additive 1 for toner | 0.20 |
| Toner 18 | Toner particle 1 | External additive 1 for toner | 18.0 |
| Toner 19 | Toner particle 1 | External additive 1 for toner | 21.0 |
| Toner 20 | Toner particle 1 | External additive 16 for toner | 6.0 |
| Toner 21 | Toner particle 1 | External additive 17 for toner | 6.0 |
| Toner 22 | Toner particle 1 | External additive 18 for toner | 6.0 |
| Toner 23 | Toner particle 1 | External additive 19 for toner | 6.0 |
| Toner 24 | Toner particle 1 | External additive 20 for toner | 6.0 |
| Toner 25 | Toner particle 1 | External additive 21 for toner | 6.0 |
| Toner 26 | Toner particle 1 | External additive 22 for toner | 6.0 |
| Toner 27 | Toner particle 1 | External additive 23 for toner | 6.0 |
| Toner 28 | Toner particle 1 | External additive 24 for toner | 6.0 |
| Toner 29 | Toner particle 1 | External additive 25 for toner | 6.0 |

Production Example of Carrier 1

Magnetite 1 having a number-average particle diameter of 0.30 μm (magnetization intensity under a magnetic field of 1,000/4n (kA/m) of 65 $Am^2/kg$)

Magnetite 2 having a number-average particle diameter of 0.50 μm (magnetization intensity under a magnetic field of 1,000/4π (kA/m) of 65 $Am^2/kg$)

To 100 parts of each of the above-mentioned materials, 4.0 parts of a silane compound (3-(2-aminoethylaminopropyl)trimethoxysilane) was added, and the mixture was subjected to high-speed mixing and stirring at 100° C. or more in a vessel to treat fine particles of each material.

Next, the following materials were placed in a flask.

Phenol: 10 parts

Formaldehyde solution: 6 parts (formaldehyde: 40 mass %, methanol: 10 mass %, water: 50 mass %)

Magnetite 1 treated with the above-mentioned silane compound: 58 parts

Magnetite 2 treated with the above-mentioned silane compound: 26 parts 28 mass % aqueous ammonia solution: 5 parts Water: 20 parts While the contents were stirred and mixed, the temperature was increased to 85° C. in 30 minutes and held to perform a polymerization reaction for 3 hours to cure a produced phenol resin. After that, the cured phenol resin was cooled to 30° C., and water was added. After that, the supernatant was removed, and the precipitate was washed with water and then air-dried. Then, the air-dried product was dried under reduced pressure (5 mmHg or less) at a temperature of 60° C. to provide a spherical carrier 1 of a magnetic material dispersion type. The 50% particle diameter (D50) of the carrier on a volume basis was 34.2 μm.

Production Example of Two-component Developer 1

8.0 Parts of the toner 1 was added to 92.0 parts of the carrier 1, and the contents were mixed with a V-type mixer (V-20 manufactured by Seishin Enterprise Co., Ltd.) to provide a two-component developer 1.

Production Examples of Two-component Developers 2 to 29

Two-component developers 2 to 29 were obtained in the same manner as in the production example of the two-component developer 1 except that the toner 1 was changed to the toners 2 to 29, respectively.

Example 1

<Method of Evaluating Toner>

A full-color copying machine imagePRESS C800 manufactured by Canon Inc. was used as an image forming apparatus. The above-mentioned two-component developer 1 was loaded into a developing unit for cyan of the image forming apparatus, and the above-mentioned toner 1 was loaded into a toner container for cyan. Then, evaluations described later were performed.

As the reconstructed point, a mechanism for discharging a magnetic carrier, which became excessive in the developing unit, from the developing unit was removed. The toner laid-on level on paper in an FFh image (solid image) was adjusted to be 0.45 mg/$cm^2$. FFh is a value obtained by representing 256 gradations in hexadecimal notation; 00h represents the first gradation (white portion) of the 256 gradations, and FFh represents the 256th gradation (solid portion) of the 256 gradations.

(1-1) Measurement of Change in Image Density at Image Ratio of 80%

As evaluation paper, plain paper GF-C081 (A4, basis weight: 81.4 g/$m^2$, available from Canon Marketing Japan Inc.) was used.

An image output test on 10,000 sheets was performed at an image ratio of 80%. During the continuous passage of 10,000 sheets, sheet passage was performed under the same development and transfer conditions (without calibration) as those of the first sheet.

The above-mentioned test was performed under a normal-temperature and normal-humidity environment (temperature: 25° C., relative humidity: 55%). Measurement of an initial density (first sheet) and the density of an image on the 10,000th sheet in printing at an image ratio of 80% was performed through use of an X-Rite color reflectance densitometer (500 series: manufactured by X-Rite Inc.), and ranking was performed based on the following criteria through use of a difference A between the densities. D or higher was determined to be satisfactory. The evaluation results are shown in Table 3.

(Evaluation Criteria: Image Density Difference Δ)

A: Less than 0.02
B: 0.02 or more and less than 0.04
C: 0.04 or more and less than 0.06
D: 0.06 or more and less than 0.08
E: 0.08 or more (1-2) Measurement of Change in Image Density at Image Ratio of 5%

As evaluation paper, plain paper GF-C081 (A4, basis weight: 81.4 g/$m^2$, available from Canon Marketing Japan Inc.) was used.

An image output test on 10,000 sheets was performed at an image ratio of 5%. During the continuous passage of 10,000 sheets, sheet passage was performed under the same development and transfer conditions (without calibration) as those of the first sheet.

The above-mentioned test was performed under a normal-temperature and normal-humidity environment (temperature: 25° C., relative humidity: 55%). Measurement of an initial density (first sheet) and the density of an image on the 10,000th sheet in printing at an image ratio of 5% was performed through use of an X-Rite color reflectance densitometer (500 series: manufactured by X-Rite Inc.), and ranking was performed based on the following criteria through use of a difference A between the densities. D or higher was determined to be satisfactory. The evaluation results are shown in Table 3.

(Evaluation Criteria: Image Density Difference Δ)

A: less than 0.02
B: 0.02 or more and less than 0.04
C: 0.04 or more and less than 0.06
D: 0.06 or more and less than 0.08
E: 0.08 or more Examples 2 to 19

Evaluations were performed in the same manner as in Example 1 except that the two-component developers 2 to 19 were used. The evaluation results of Examples 2 to 19 are shown in Table 3.

Comparative Examples 1 to 10

Evaluations were performed in the same manner as in Example 1 except that the two-component developers 20 to 29 were used. The evaluation results of Comparative Examples 1 to 10 are shown in Table 3.

TABLE 3

| | Two-component developer | Change in image density at image ratio of 80% | | Change in image density at image ratio of 5% | |
|---|---|---|---|---|---|
| | No. | Rank | Value | Rank | Value |
| Example 1 | Two-component developer 1 | A | 0.01 | A | 0.02 |
| Example 2 | Two-component developer 2 | B | 0.03 | C | 0.05 |
| Example 3 | Two-component developer 3 | A | 0.02 | B | 0.03 |
| Example 4 | Two-component developer 4 | C | 0.05 | C | 0.05 |
| Example 5 | Two-component developer 5 | B | 0.03 | B | 0.04 |
| Example 6 | Two-component developer 6 | B | 0.04 | B | 0.03 |
| Example 7 | Two-component developer 7 | B | 0.03 | C | 0.06 |
| Example 8 | Two-component developer 8 | A | 0.02 | B | 0.04 |
| Example 9 | Two-component developer 9 | C | 0.05 | B | 0.03 |

TABLE 3-continued

| | Two-component developer | Change in image density at image ratio of 80% | | Change in image density at image ratio of 5% | |
|---|---|---|---|---|---|
| | No. | Rank | Value | Rank | Value |
| Example 10 | Two-component developer 10 | B | 0.03 | A | 0.02 |
| Example 11 | Two-component developer 11 | B | 0.04 | B | 0.03 |
| Example 12 | Two-component developer 12 | A | 0.02 | B | 0.03 |
| Example 13 | Two-component developer 13 | A | 0.02 | C | 0.05 |
| Example 14 | Two-component developer 14 | B | 0.03 | B | 0.04 |
| Example 15 | Two-component developer 15 | B | 0.04 | C | 0.05 |
| Example 16 | Two-component developer 16 | B | 0.03 | D | 0.07 |
| Example 17 | Two-component developer 17 | B | 0.03 | C | 0.05 |
| Example 18 | Two-component developer 18 | C | 0.06 | B | 0.03 |
| Example 19 | Two-component developer 19 | D | 0.07 | B | 0.03 |
| Comparative Example 1 | Two-component developer 20 | D | 0.08 | E | 0.11 |
| Comparative Example 2 | Two-component developer 21 | E | 0.09 | D | 0.07 |
| Comparative Example 3 | Two-component developer 22 | D | 0.08 | E | 0.10 |
| Comparative Example 4 | Two-component developer 23 | E | 0.09 | E | 0.09 |
| Comparative Example 5 | Two-component developer 24 | D | 0.07 | E | 0.09 |
| Comparative Example 6 | Two-component developer 25 | E | 0.09 | D | 0.07 |
| Comparative Example 7 | Two-component developer 26 | E | 0.09 | D | 0.08 |
| Comparative Example 8 | Two-component developer 27 | E | 0.10 | D | 0.08 |
| Comparative Example 9 | Two-component developer 28 | D | 0.08 | E | 0.09 |
| Comparative Example 10 | Two-component developer 29 | E | 0.06 | D | 0.10 |

When the shape of the external additive is optimized, the external additive adheres to the toner particles with a high adhesive force, and can express a low adhesive force with respect to the other members when being brought into contact with the other members under a state of being carried on the surfaces of the toner particles. Accordingly, the stability of the toner is improved, and the toner becomes excellent in durable stability, with the result that a high-quality image can be obtained for a long period of time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-183911, filed Nov. 17, 2022, and Japanese Patent Application No. 2023-176392, filed Oct. 12, 2023, which are hereby incorporated by reference herein in their entirety.

What is claimed is:

1. An external additive for toner comprising an external additive particle containing:

a fine particle A; and a plurality of fine particles B that are each present so as to partially protrude from a surface of the fine particle A, wherein the fine particle A (i) is a particle of an organosilicon compound having a siloxane bond, (ii) has a number-average particle diameter of 0.03 μm or more and 0.30 μm or less, and (iii) has an average circularity of 0.90 or more, wherein, when the number-average particle diameter of the fine particle A is represented by $D_A$, and a number-average particle diameter of the plurality of fine particles B is represented by $D_B$, $D_B/D_A$ is 0.10 or more and 0.63 or less, wherein the plurality of fine particles B have an average value of embedding ratios, each of which is defined by the following expression (1), of 30% or more and 80% or less, and wherein, when a projection image of the external additive particle is obtained, and a line that convexly closes the projection image is drawn, the line that convexly closes the projection image has a portion that overlaps a contour of the fine particle A, $$\text{Embedding ratio (\%) of fine particle } B = (\text{depth of fine particle } B \text{ embedded in fine particle } A/\text{diameter of fine particle } B)\times 100 \tag{1}$$

2. The external additive for toner according to claim 1, wherein the average value of the embedding ratios of the plurality of fine particles B, each of which is defined by the expression (1), is 50% or more and 80% or less.

3. The external additive for toner according to claim 1, wherein the $D_B/D_A$ is 0.30 or more and 0.55 or less.

4. The external additive for toner according to claim 1, wherein an average number $N_B$ of the plurality of fine particles B in the external additive particle satisfies the following expression (2), $$1.2\times D_A/D_B < N_B \leq 3.0\times D_A/D_B \tag{2}$$

5. The external additive for toner according to claim 1, wherein, in the fine particle A, content ratios, on a number basis, of the following unit (a), unit (b), and unit (c) with respect to all silicon atoms present in the fine particle A satisfy the following expressions (3-1) and (3-2):

$$(a)+(b)+(c)\geq 0.80 \quad (3\text{-}1)$$

$$(b)+(c)\geq 0.30 \quad (3\text{-}2)$$

(a)

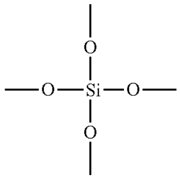

(b)

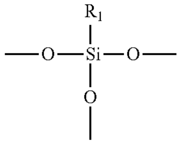

(c)

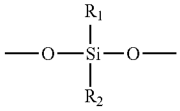

where $R_1$ and $R_2$ each represent an alkyl group having 1 or more and 6 or less carbon atoms.

6. The external additive for toner according to claim 5, wherein, in the fine particle A, the content ratios of the unit (a), the unit (b), and the unit (c) satisfy the following expressions (4-1), (4-2), and (4-3), $$0.30\leq (a)/((a)+(b)+(c))\leq 0.80 \quad (4\text{-}1)$$

$$0\leq (b)/((a)+(b)+(c))\leq 0.50 \quad (4\text{-}2)$$

$$0.20\leq (c)/((a)+(b)+(c))\leq 0.70 \quad (4\text{-}3)$$

7. The external additive for toner according to claim 1, wherein the plurality of fine particles B are each one of a silica fine particle or an alumina fine particle.

8. A toner comprising:

a toner particle; and an external additive for toner comprising an external additive particle containing:

a fine particle A; and a plurality of fine particles B that are each present so as to partially protrude from a surface of the fine particle A, wherein the fine particle A (i) is a particle of an organosilicon compound having a siloxane bond, (ii) has a number-average particle diameter of 0.03 µm or more and 0.30 µm or less, and (iii) has an average circularity of 0.90 or more, wherein, when the number-average particle diameter of the fine particle A is represented by $D_A$, and a number-average particle diameter of the plurality of fine particles B is represented by $D_B$, $D_B/D_A$ is 0.10 or more and 0.63 or less, wherein the plurality of fine particles B have an average value of embedding ratios, each of which is defined by the following expression (1), of 30% or more and 80% or less, and wherein, when a projection image of the external additive particle is obtained, and a line that convexly closes the projection image is drawn, the line that convexly closes the projection image has a portion that overlaps a contour of the fine particle A, $$\text{Embedding ratio (\%) of fine particle } B = (\text{depth of fine particle } B \text{ embedded in fine particle } A/\text{diameter of fine particle } B)\times 100 \quad (1)$$

9. The toner according to claim 8, wherein a content of the external additive for toner with respect to 100 parts by mass of the toner particle is 0.1 part by mass or more and 20.0 parts by mass or less.

* * * * *